(12) United States Patent
Meyer et al.

(10) Patent No.: US 7,975,397 B2
(45) Date of Patent: Jul. 12, 2011

(54) MULTIPLE DEGREE OF FREEDOM DISPLACEMENT TRANSDUCER

(75) Inventors: Richard A. Meyer, Chaska, MN (US);
Byron J. Saari, Minneapolis, MN (US);
Douglas J. Olson, Plymouth, MN (US);
Paul J. Carroll, Maple Grove, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 12/728,695

(22) Filed: Mar. 22, 2010

(65) Prior Publication Data

US 2010/0236336 A1 Sep. 23, 2010

Related U.S. Application Data

(60) Provisional application No. 61/162,192, filed on Mar. 20, 2009.

(51) Int. Cl.
*G01B 5/25* (2006.01)
(52) U.S. Cl. .................. 33/613; 33/1 N; 33/787
(58) Field of Classification Search ............ 33/1 N, 33/1 PT, 534, 559, 613, 645, 700, 787
See application file for complete search history.

(56) References Cited

U.S. PATENT DOCUMENTS

| | | | |
|---|---|---|---|
| 3,160,219 A | 12/1964 | Meier | |
| 3,590,933 A | 7/1971 | Forman | |
| 3,789,508 A | 2/1974 | Meline | |
| 3,955,638 A | 5/1976 | Wasko | |
| 4,153,124 A | 5/1979 | Knothe et al. | |
| 4,491,021 A | 1/1985 | Meline | |
| 4,559,717 A * | 12/1985 | Scire et al. | 33/568 |
| 4,607,531 A | 8/1986 | Meline et al. | |
| 4,841,226 A | 6/1989 | Meline et al. | |

(Continued)

FOREIGN PATENT DOCUMENTS

DE 102007008155 A1 8/2008

OTHER PUBLICATIONS

Notification of Transmittal of the International Search Report and Written Opinion from corresponding International Application No. PCT/US2010/028112, mailed Nov. 3, 2010.

*Primary Examiner* — G. Bradley Bennett
(74) *Attorney, Agent, or Firm* — Steven M. Koehler; Westman, Champlin & Kelly, P.A.

(57) ABSTRACT

A multiple degree of freedom displacement transducer and body thereof is used to measure linear displacements along and/or rotational or pivotal displacements about up to three orthogonal axes. In one embodiment, a displacement transducer body includes a first pivoting assembly and a second pivoting assembly. Each pivoting assembly has a support member pivotable relative to another portion about two orthogonal axes. A structure joins said another portion of each pivoting assembly together. In another embodiment, a displacement transducer includes a first support member, a second support member, and a cross flexure assembly joining the first support member to the second support member. The cross flexure assembly is arranged to allow the first support member to pivot relative to the second support member about two intersecting orthogonal axes. An angular sensing device is arranged to provide an output signal related to angular movement of the first support member relative to the second support member about at least one of the orthogonal axes.

20 Claims, 12 Drawing Sheets

U.S. PATENT DOCUMENTS

| | | |
|---|---|---|
| 4,844,192 A | 7/1989 | Wirth |
| 4,879,906 A | 11/1989 | Meline et al. |
| 4,939,445 A | 7/1990 | Meline et al. |
| 5,119,569 A | 6/1992 | Meline |
| 5,339,699 A * | 8/1994 | Carignan .................. 73/862.69 |
| 5,600,895 A | 2/1997 | Meyer et al. |
| 5,712,430 A | 1/1998 | Meyer |
| 5,887,356 A * | 3/1999 | Sheldon ......................... 33/556 |
| 7,348,502 B2 | 3/2008 | Meyer et al. |
| 2004/0261276 A1 * | 12/2004 | Walker et al. ................. 33/1 M |
| 2007/0221418 A1 | 9/2007 | Meyer et al. |
| 2010/0257747 A1 * | 10/2010 | Guzik et al. .................... 33/645 |

* cited by examiner

MULTIPLE DEGREE OF FREEDOM DISPLACEMENT TRANSDUCER

CROSS-REFERENCE TO RELATED APPLICATION

This application claims the benefit of U.S. Provisional Patent applications entitled "MULTIPLE DEGREES OF FREEDOM DISPLACEMENT TRANSDUCER" having Ser. No. 61/162,192, filed Mar. 20, 2009, the content of which are incorporated herein by reference in its entirety.

BACKGROUND

The discussion below is merely provided for general background information and is not intended to be used as an aid in determining the scope of the claimed subject matter.

Various forms of displacement transducers are known in the art; however, there is an on going need for improved high precision displacement transducers that can measure displacement in multiple degrees of freedom.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A multiple degree of freedom displacement transducer and body thereof is used to measure linear displacements along and/or rotational or pivotal displacements about up to three orthogonal axes.

In one embodiment, a displacement transducer body includes a first pivoting assembly and a second pivoting assembly. Each pivoting assembly has a support member pivotable relative to another portion about two orthogonal axes. A structure joins said another portion of each pivoting assembly together.

The following features can be optionally included alone or in combination with the foregoing embodiment.

The two orthogonal axes of each pivoting assembly can be arranged to intersect.

The structure can comprise a rigid spacer or a movable structure that allows movement of said another portion of each pivoting assembly linearly along and/or rotationally about an axis that is mutually orthogonal to each of the two orthogonal axes. If desired, a sensing device can be included and configured to provide an output signal related to movement of said another portion of each pivoting assembly relative to each other linearly along and/or rotationally about the axis that is mutually orthogonal to each of the two orthogonal axes.

Each pivoting assembly can include angular sensing devices to provide output signals related to angular movement of the support member relative to said another portion of each pivoting assembly about each of the two orthogonal axes.

Each of the pivoting assemblies can include a cross flexure assembly allowing the support member to pivot relative to the another portion about the two orthogonal axes. In one embodiment, each cross flexure assembly includes an intermediate member and a first cross flexure arrangement of flexure members coupling the intermediate member to the support member and a second cross flexure arrangement of flexure members coupling the intermediate member to the another portion. In one embodiment, the first cross flexure arrangement includes a first pair of orthogonal flexible plates with a set of orthogonal flexible plates of the first pair of orthogonal flexible plates disposed on each side of the intermediate member so as to define a first axis of the two orthogonal axes, and wherein the second cross flexure arrangement includes a second pair of orthogonal flexible plates with a set of orthogonal flexible plates of the second pair of orthogonal flexible plates disposed on each side of the intermediate member so as to define a second axis of the two orthogonal axes.

In one embodiment, a displacement transducer includes a first support member, a second support member, and a cross flexure assembly joining the first support member to the second support member. The cross flexure assembly is arranged to allow the first support member to pivot relative to the second support member about two intersecting orthogonal axes. An angular sensing device is arranged to provide an output signal related to angular movement of the first support member relative to the second support member about at least one of the orthogonal axes.

The following features can be optionally included alone or in combination with the immediately foregoing embodiment.

The angular sensing device can provide an output signal related to angular movement of the first support member relative to the second support member about each of the orthogonal axes.

Each cross flexure assembly can include an intermediate member and a first cross flexure arrangement of flexure members coupling the intermediate member to the first support member and a second cross flexure arrangement of flexure members coupling the intermediate member to the second support member. In one embodiment, the first cross flexure arrangement includes a first pair of orthogonal flexible plates with a set of orthogonal flexible plates of the first pair of orthogonal flexible plates disposed on each side of the intermediate member so as to define a first axis of the two orthogonal axes, and wherein the second cross flexure arrangement includes a second pair of orthogonal flexible plates with a set of orthogonal flexible plates of the second pair of orthogonal flexible plates disposed on each side of the intermediate member so as to define a second axis of the two orthogonal axes.

For any of the sensing devices mentioned above various types or technologies can be used to measure linear and angular displacements. Such sensing devices can be electrically (e.g. inductive, capacitive or resistive sensors), magnetically (e.g. magnetostriction sensors), optically (e.g. laser interferometer) based, or be combinations thereof. The sensing devices can include non-contacting elements supported by standoffs on portions of the transducer body such as but not limited to that described and illustrated in U.S. Pat. No. 4,841, 226. One advantageous embodiment, includes using strain gauges mounted to one or more of the flexible members, typically in a Wheatstone bridge circuit as is known in the art, so as to detect the strain therein due to linear or pivotal displacement of the elements to which there are connected. The outputs of the sensing devices used, such as but not limited to the strain gauges, are provided to a recorder and/or processing device such as a computing device having a digital processor. The outputs of the sensing devices corresponding to angular displacements can then be used with the physical dimensions of the displacement transducer (for example, the spacing between the support members and the length of the structure) to compute the linear and rotational displacements along and about reference, mutually orthogonal axes. Computations can be based on mathematic equations and/or lookup tables, embodied in hardware and/or software as computer readable instructions, and can include cross-talk or other error compensation as is well known in the art.

The displacement transducer(s) can be included in a test system having a test specimen support assembly arranged to support a test specimen and an actuator arranged to displace and/or apply a load to the test specimen.

DETAILED DESCRIPTION OF THE EXEMPLARY EMBODIMENTS

An aspect of this disclosure relates to a multiple degree of freedom displacement transducer used to measure linear displacements along and/or rotational or pivotal displacements about up to three orthogonal axes. Various forms of such transducers will be illustrated and described. As appreciated by those skilled in the art, changes can be made to the examples, including alternative designs not disclosed, and still be within inventive concepts herein presented. Hence, aspects of the invention are not, and should not be, limited to the examples herein provided.

Figure 1:
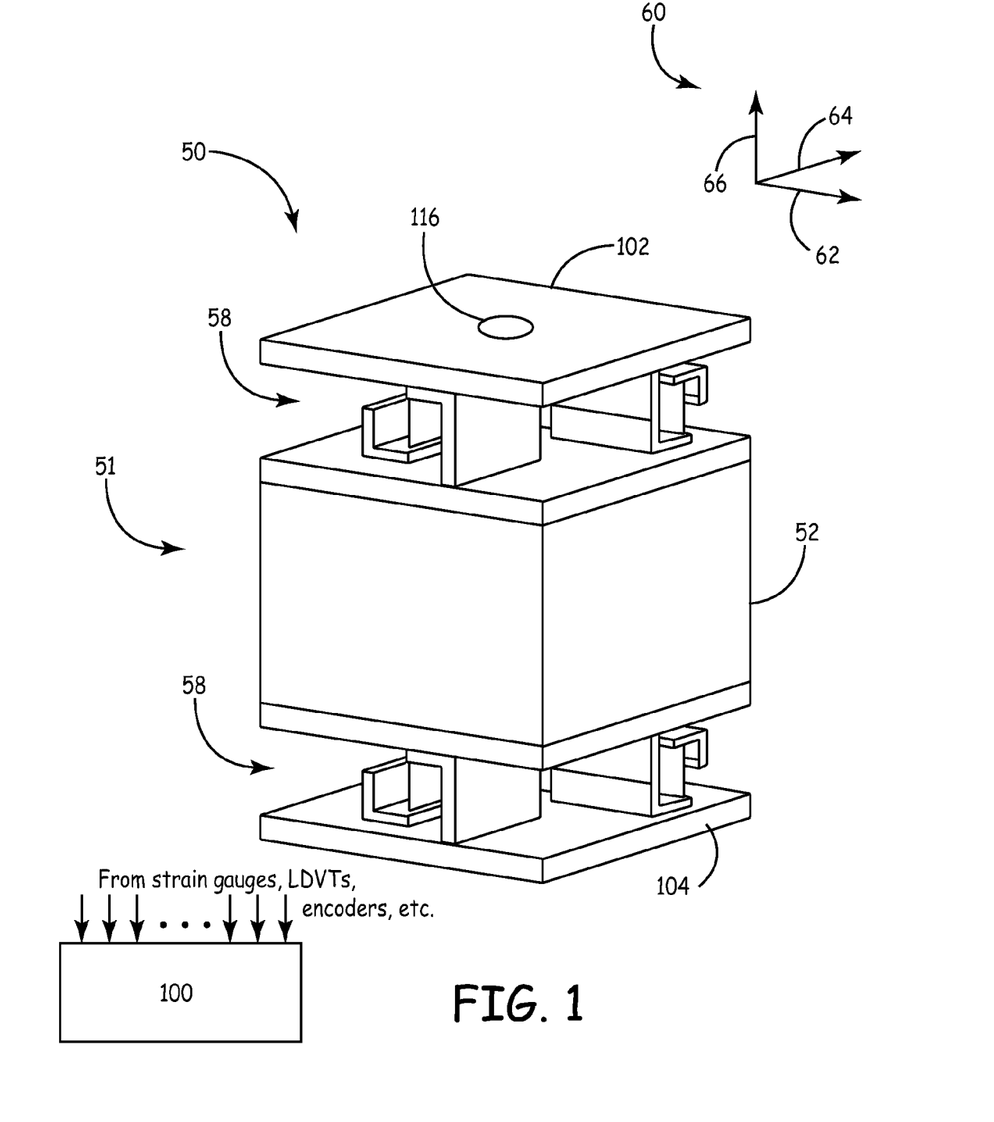
FIG. 1 is a perspective view of a first embodiment of a displacement transducer or body thereof.

A first embodiment of a multiple degree of freedom displacement transducer is schematically illustrated in FIG. 1 at 50. In this embodiment, the displacement transducer 50 includes a body 51 comprising two gimbal or pivoting assemblies 58 separated from each other by structure such as a spacer 52. In this configuration, the displacement transducer 50 can be configured to measure up to four degrees of freedom, in particular with respect to coordinate axes 60, two linear displacements along axes 62 and 64 as well as rotation or pivotal displacement about axes 62 and 64. In this embodiment, linear displacement along, and rotation or pivotal displacement about axis 66 is not provided.

Figure 2:
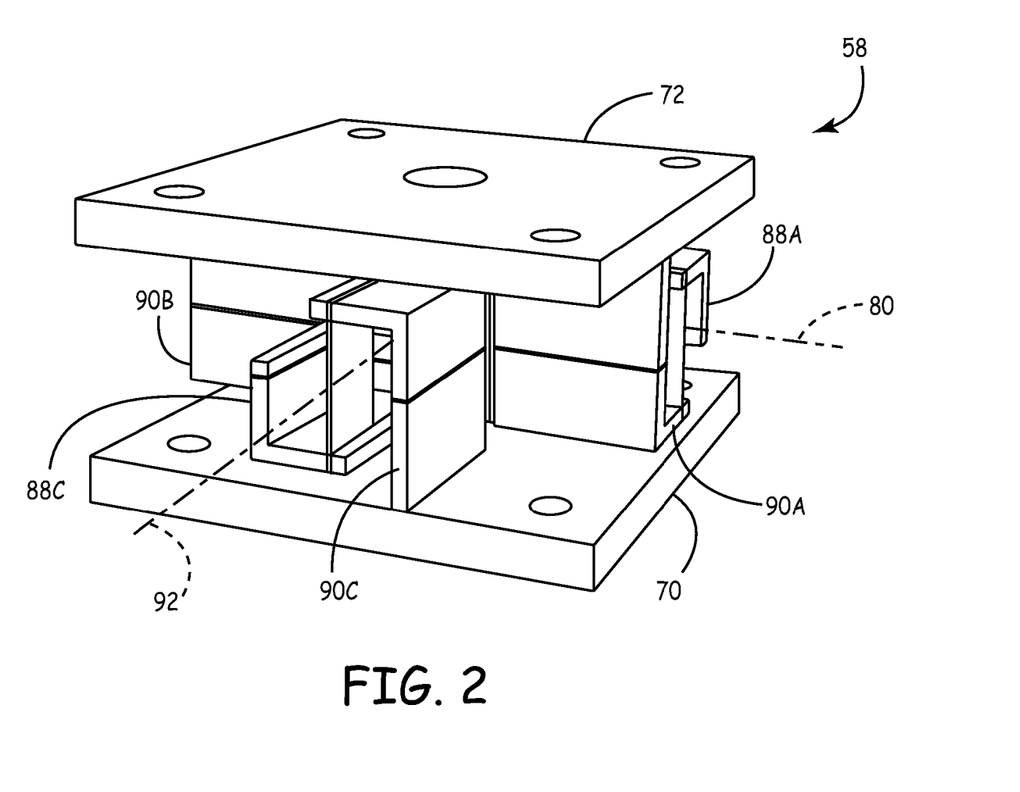
FIG. 2 is a perspective view of a first embodiment of a pivoting assembly that can comprise a second embodiment of a displacement transducer or body thereof.
Figure 3:
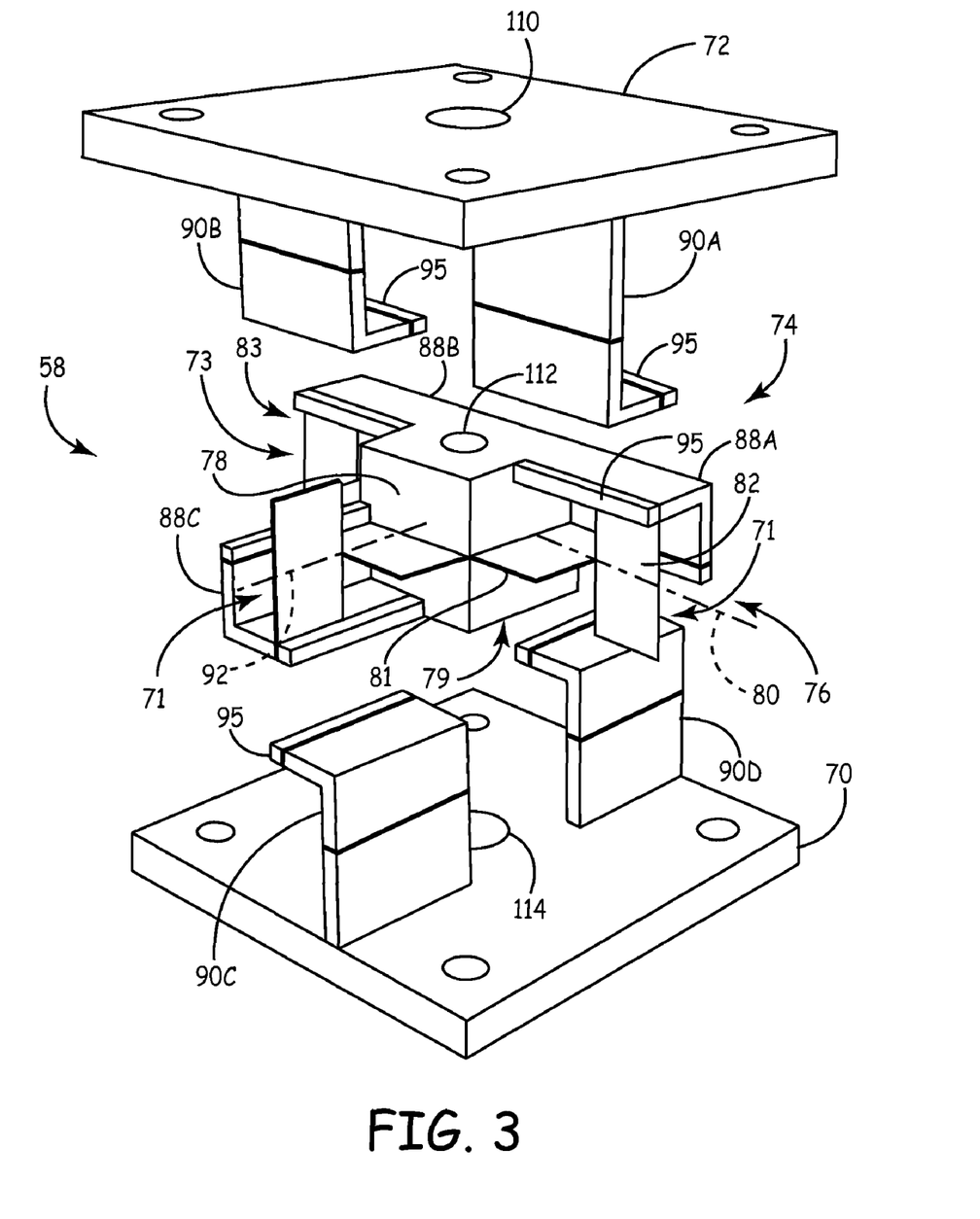
FIG. 3 is an exploded view of the pivoting assembly of FIG. 2.
Figure 4:
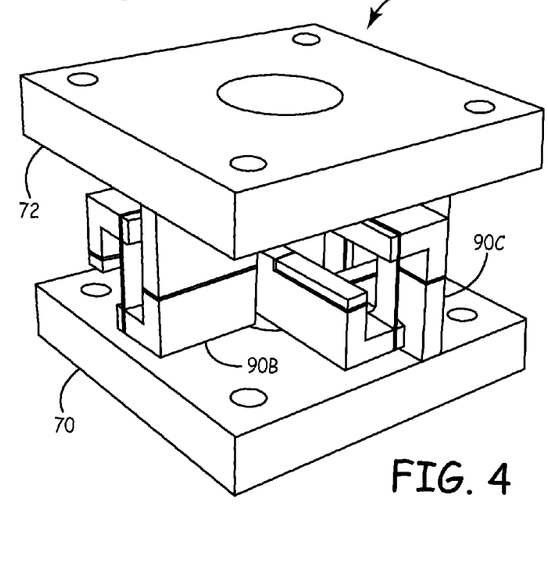
FIG. 4 is a perspective view of a second embodiment of a pivoting assembly that can comprise a third embodiment of a displacement transducer or body thereof.
Figure 5:
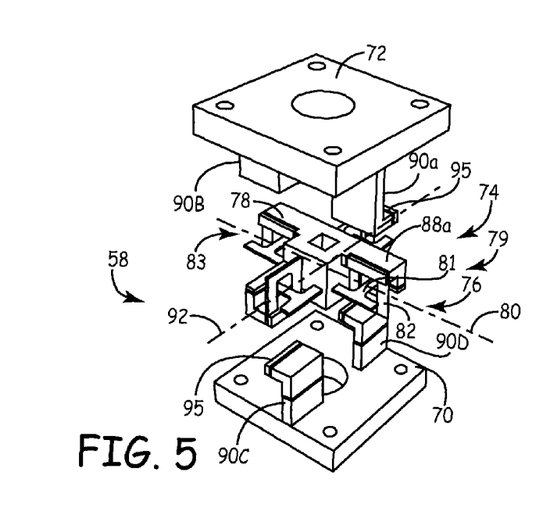
FIG. 5 is an exploded view of the pivoting assembly of FIG. 4.
Figure 6:
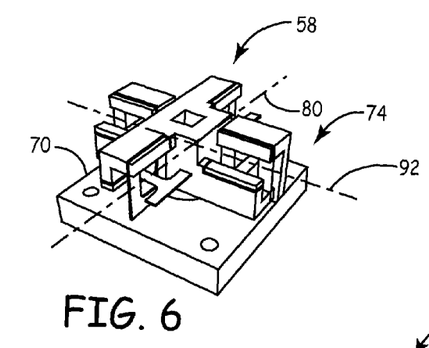
FIG. 6 is a perspective view of the pivoting assembly of FIG. 4 with portions removed.
Figure 7:
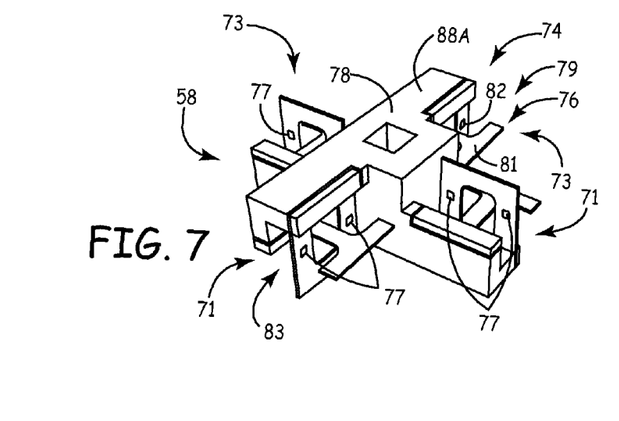
FIG. 7 is a perspective view of the pivoting assembly of FIG. 4 with portions removed and strain gauges provided thereon.

Referring to FIGS. 2 and 3, the pivot assembly 58 can take a number of forms, and in the embodiment illustrated is pivotable in two degrees of freedom about orthogonal axes 80 and 92 that are coincident in the same plane (i.e. the axes 80 and 92 intersect). For instance, the pivot assembly 58 can comprise a U-joint formed from mechanical bearing elements, fluid bearings (e.g. hydrostatic), or the like. In the embodiment illustrated, pivot assembly 58 comprises a dual axis cross flexure assembly providing two orthogonal degrees of pivoting motion. Support members 70 and 72 pivot relative to each other in two orthogonal degrees of freedom. Pivoting motion is provided by a flexure assembly 74 having a plurality of flexure members, herein by example, thin flexible plates 76. The flexure members comprise a first cross flexure arrangement 71 coupling support member 70 to the intermediate member 78 and a second cross flexure arrangement 73 coupling support member 72 to the intermediate member 78. In particular, each of the flexible plates is joined at one end to intermediate member 78, while a second end is joined to support member 70 or 72. Although illustrated herein where intermediate member 78 and support members 70 and 72 are rectangular, it should be understood that the intermediate member 78 and support members 70 and 72 can take any desired shape.

At least one pair of orthogonal plates is provided to allow support member 70 to pivot with respect to support member 72 along an axis generally coinciding with the planes of the intersection of the plates. Referring to FIG. 2, support member 70 can pivot with respect to support member 72 generally about the axis 80. In the embodiment illustrated, this pivoting motion is provided by two spaced apart sets of orthogonally arranged plates. Referring back to FIG. 3, a first pair 79 comprises plates 81 and 82, while a second pair 83 is identical to the first pair and disposed on the other side of the intermediate member 78. In the embodiment illustrated, intermediate member 78 includes a support 88A extending therefrom, while support member 72 includes a downwardly extending support 90A. Plates 81 and 82 are coupled to supports 88A and 90A in an orthogonal relationship as illustrated. The second pair of orthogonal plates 83 is coupled to supports 88B and 90B in a similar fashion again in order to allow pivoting motion generally about axis 80. It should be noted the plates are joined to respective portions with suitable fastening devices such as threaded bolts. Likewise, mounting blocks 95 and fastening devices such as threaded bolts can be used to secure ends of the flexible plates In a manner similar to that described above with respect to axis 80, two spaced-apart sets of orthogonal pairs of flexible plates are coupled to supports of intermediate member 78 (i.e., 88C and another support not shown on the opposite side of intermediate member 78) and upwardly extending supports 90C and 90D from support member 70. These orthogonal pairs of plates allow support members 70 and 72 to pivot generally about the axis 92. Each of the flexible plates 76 of these supports can be secured at ends thereof between portions of the support members 90A-90D and 78, where the portions are fastened together with suitable fastening devices such as threaded bolts. Likewise, mounting blocks 95 and fastening devices such as threaded bolts can be used to secure ends of the flexible plates.

It is important to understand that this is but one embodiment on how to arrange cross flexures in order to provide pivoting motion. For example, if desired, one of the orthogonal cross flexure plates can include an aperture of size to allow the other corresponding flexure plate to extend therethrough as illustrated in FIGS. 4-7, where like components have been identified with the same reference numbers as used in FIGS. 1-3.

Linear and rotational displacement along and about axes 62 and 64 is in effect determined by relative angular displacements of support members 70 and 72 on each of the pivoting assemblies 58. Various types of sensing devices can be used to measure angular displacements (in the embodiment illustrated in two degrees of freedom on each pivoting assembly 58) between support members 70 and 72. Such sensing devices can be electrically (e.g. inductive, capacitive or resistive sensors), magnetically (e.g. magnetostriction sensors), optically (e.g. laser interferometer) based, or be combinations thereof. The sensing devices can include non-contacting elements supported by standoffs on one or both of the support members 70 and 72 such as but not limited to that described and illustrated in U.S. Pat. No. 4,841,226, which is incorporated herein by reference in its entirety. One advantageous embodiment, includes using strain gauges 77 (FIG. 7) mounted to one or more of the flexible plates 76, typically in a Wheatstone bridge circuit using strain gauges on opposite surfaces of the flexible plate 76 as is known in the art, so as to detect the strain therein due to pivotal displacement of support members 70 and 72 relative to each other. The strain in the corresponding flexible plates 76 for each of the axes 80 and 92 is related to the angular displacement about the axes. The outputs of the sensing devices used, such as but not limited to the strain gauges, are provided to a recorder and/or processing device 100 (FIG. 1) such as a computing device having a digital processor. The outputs of the sensing devices correspond to the angular displacements of the support members 70 and 72 for each pivoting assembly 58. These angular displacements can then be used with the physical dimensions of the displacement transducer 50 (for example, the spacing between the support members 70 and 72 and the length of the spacer 52) to compute the linear and rotational displacements along and about axes 62 and 64. Computations can be based on mathematic equations and/or lookup tables, embodied in hardware and/or software as computer readable instructions, and can include cross-talk or other error compensation as is well known in the art.

At this point it should be noted another embodiment of the invention is a displacement transducer comprising a pivoting assembly 58 having a cross flexure assembly 74 that provides pivotable motion about two intersecting orthogonal axes 80, 92 and sensing device(s) to provide output signal(s) related to angular movement of the support member 70 relative to the support member 72 about at least one or both of the two orthogonal axes 80, 92.

Referring back to FIG. 1, the displacement transducer 50 can be used in a wide variety of applications. The transducer 50 measures relative position of a member such as a test specimen coupled to the outermost support members 102 and 104, where support member 102 corresponds to support member 72 of the upper pivoting assembly 58, and support member 104 corresponds to support member 70 of the lower pivoting assembly 58. It should be noted in one embodiment, the test specimen can be coupled to support members 102 and 104 and be located outboard of transducer 50; however, in another embodiment, the test specimen can be coupled to support members 102 and 104 and extend through each of the pivoting assemblies 58 and the spacer 52. In this latter configuration, apertures 110, 112 and 114 (FIG. 3) in the pivoting assemblies 58 as well as a bore hole 116 (FIG. 1) or other clearance cavity through spacer 52 would have sufficient clearance for expected or allowable relative movement of the test specimen portions coupled to support members 102 and 104.

Figure 8:
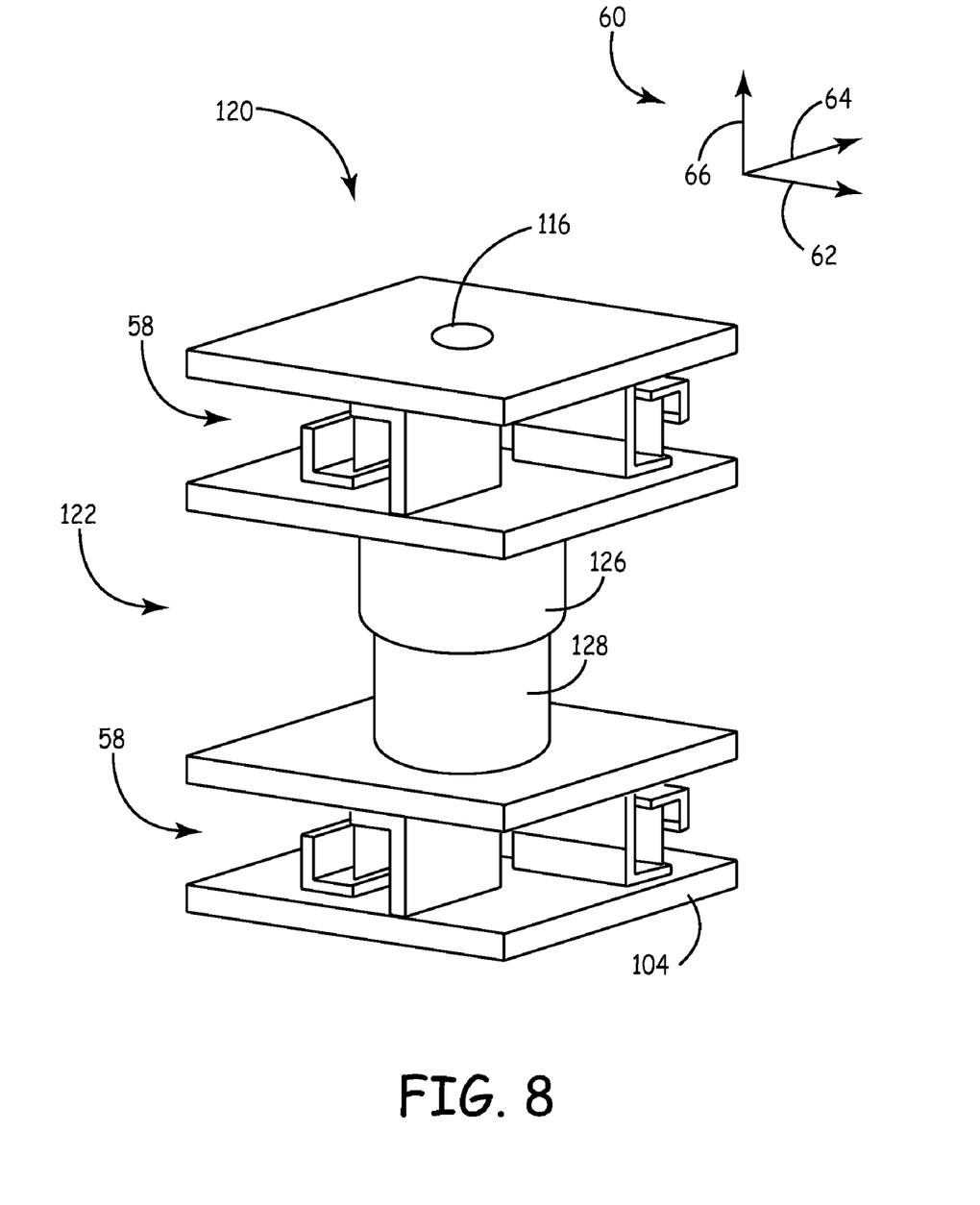
FIG. 8 a perspective view of a fourth embodiment of a displacement transducer or body thereof.

FIG. 8 illustrates a displacement transducer 120 similar to displacement transducer 50 of FIG. 1; however, displacement transducer 120 provides one or two additional degrees of freedom measurements, those being along and/or about axis 66. Rather than spacer 52, displacement transducer 120 has a movable structure allowing movement of one of the support members of one of the pivoting assemblies 58 to move relative to a support member of the other pivoting assemblies 58 linearly along or rotationally about axis 66 (mutually orthogonal to axes 62 and 64). In one embodiment, the movable structure further comprises a linear and/or rotational sensing device 122 operably coupled between the pivoting assemblies 58. As appreciated by those skilled in the art, sensing device 122 can be electrically (e.g. inductive, capacitive or resistive sensors), magnetically (e.g. magnetostriction sensors), optically (e.g. laser interferometer or encoder) based, or be combinations thereof. Sensing device 122 provides signal(s) to a recorder 100 indicative of linear and/or rotational displacements. In the embodiment illustrated in FIG. 8, the sensing device 122 comprises two (telescoping) portions 126 and 128 each with cavities, in communication with bore 116, so as to allow extension of the test specimen through the sensing device 122, if desired. By example only, each of portions 126 and 128 can have capacitive plates attached thereto or formed therein where relative movement of portions 126 and 128 linearly and/or rotationally causes a corresponding change in capacitance between the plates. The outputs of the sensor(s) used, such as but not limited to the capacitive sensor, are provided to the recorder and/or processing device 100.

Figure 9:
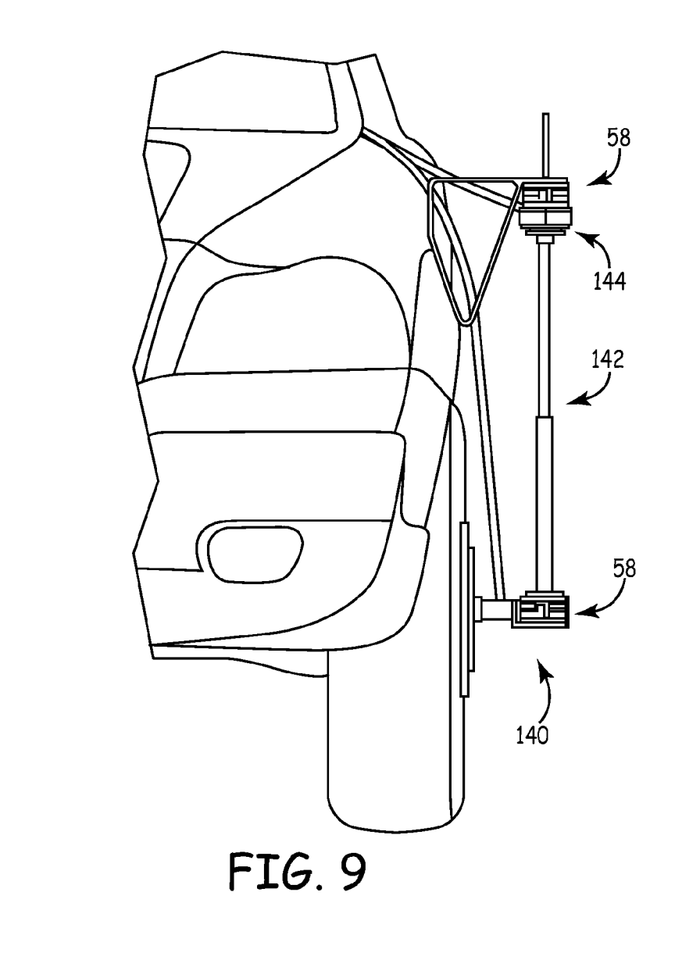
FIG. 9 is a side elevational view of a fifth embodiment of a displacement transducer.
Figure 10:
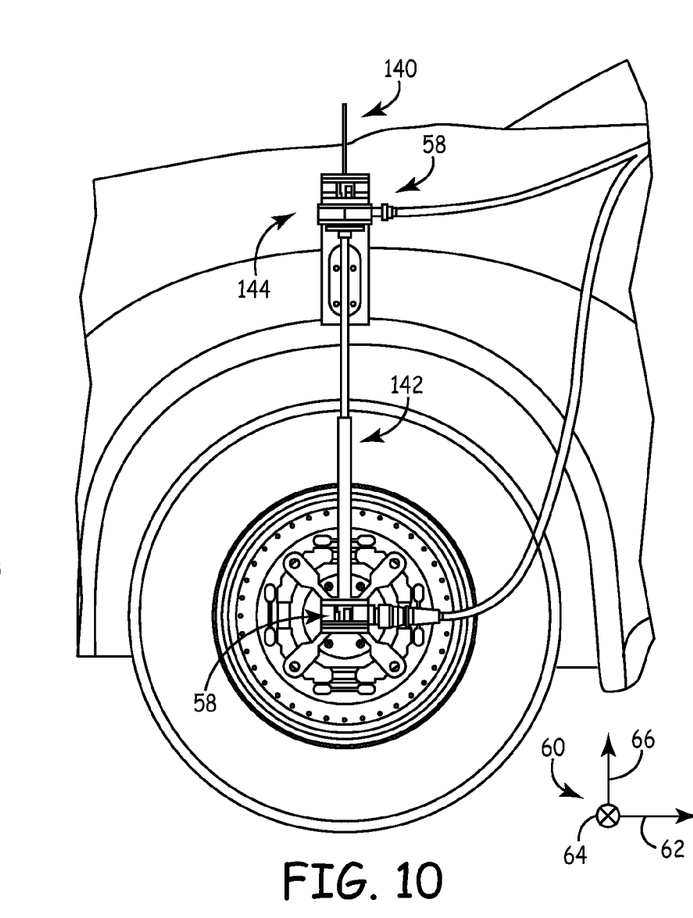
FIG. 10 is a front elevational view of the embodiment of FIG. 9.

FIGS. 9 and 10 illustrate a displacement transducer 140 to measure displacement of a vehicle spindle. In this embodiment sensing device 122 comprises a linear displacement sensor 142 to measure linear displacement and an encoder 144 to measure angular or rotational displacement.

Figures 11, 11A:
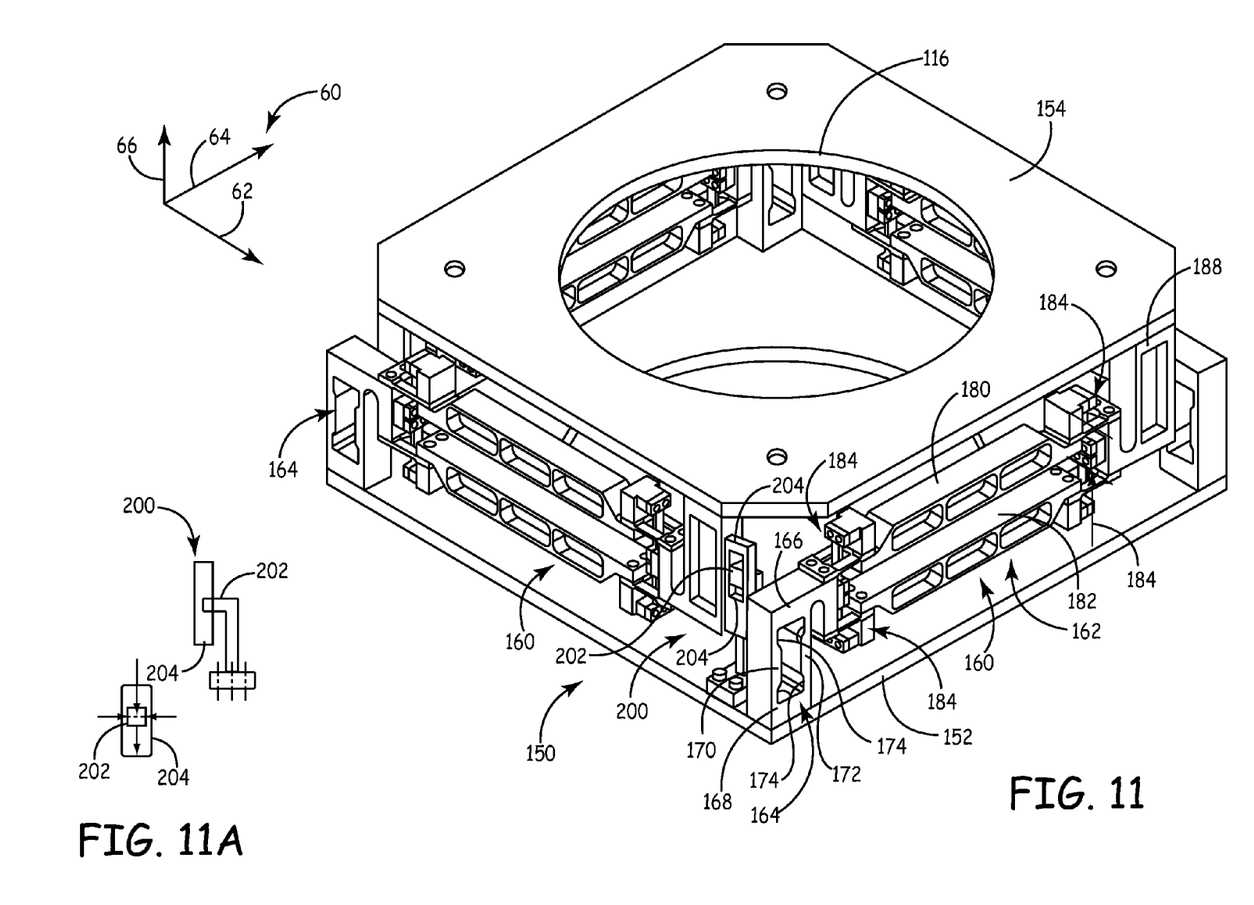
FIG. 11 is a perspective view of a linear displacement transducer body.
FIG. 11A is a schematic view of a stop.

FIG. 11 illustrates another form of a sensing device 150 operably couplable between the pivoting assemblies 58 to measure linear displacement along axis 66. Generally, sensing device 150 includes a lower support platen 152 couplable to support member 72 of lower pivoting assembly 58 and an upper support platen 154 couplable to support member 70 of upper pivoting assembly 58. If desired as illustrated, support platens 152 and 154 each can include an aperture 116 so as to accommodate extension of the test specimen through the sensing device 150 as described above.

A plurality of link assemblies 160 join the lower support platen 152 to the upper support platen 154. In the embodiment illustrated, four link assemblies are provided although in other embodiments two or more can be used. The link assemblies are substantially identical to each other. Referring to link assembly 162 by way of example, the link assembly 162 includes an isolation flexure assembly 164 comprising a rigid, upper portion 166 and a rigid, lower portion 168. Two parallel connecting arms 170 and 172 are connected to the upper portion 166 and the lower portion 168 with flexure elements 174. In the embodiment illustrated, upper portion 166, lower portion 168, connecting arms 170 and 172, and flexure elements 174 are integral being formed from a single unitary body; however, this should not be considered limiting in that if desired isolation flexure assembly 164 can be formed from separate components joined together.

Figure 12:
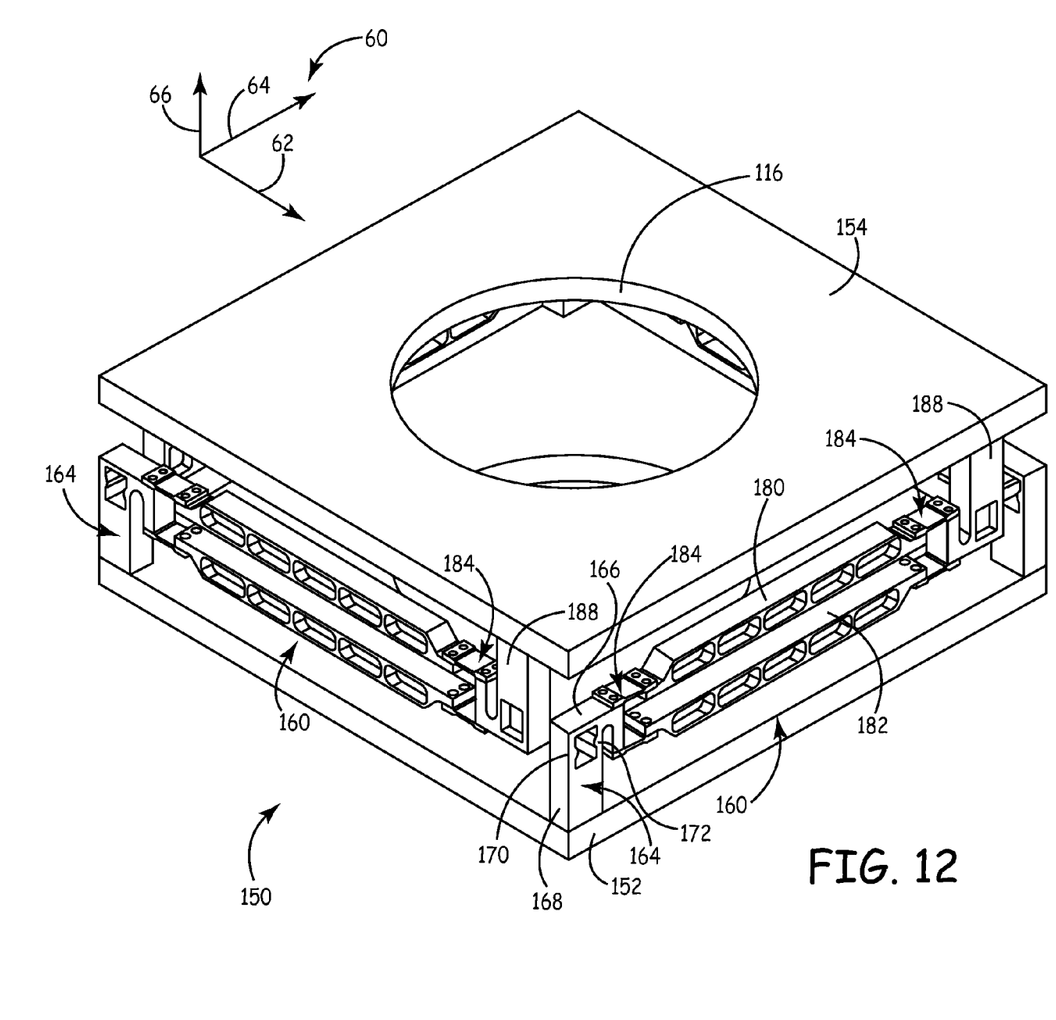
FIG. 12 is a perspective view of another linear displacement transducer body.

A pair of parallel link arms 180 and 182 connects the lower platen 152 to the upper platen 154. In the embodiment illustrated, a first end of each of the link arms 180 and 182 is joined to the upper portion 166 of isolation flexure assembly 164 through a flexure 184, while a second end of each of the link arms 180 and 182 is joined to upper platen 154 (mounting bracket 188) also through a flexure 184. (If desired, the locations of isolation flexure assembly 164 and mounting bracket 188 can be interchanged.) Each of the flexures 184 can include a cross-flexure as illustrated in FIG. 11 and described above, or alternatively, a single flexible plate as illustrated in FIG. 12.

Referring to FIGS. 11 and 11A, overtravel stop mechanisms can be provided to limit relative displacements of the platens 152 and 154. In the embodiment illustrated, an overtravel stop mechanism is indicated at 200. Although one is illustrated, a plurality of such mechanisms can be provided. Overtravel stop mechanism 200 includes a pin and slot or recess assembly wherein a pin 202 is connected to one of the platens, herein by example, platen 152, while the slot or recess 204 is formed in a mounting bracket 188 connected to the other platen, herein by example, platen 154. Contact of the pin 202 with end walls and/or side walls of the slot 204 limits displacement of the platens 152 and 154 relative to each other.

It should be noted to improve accuracy each of the isolation flexure assemblies 164 can be loaded so as to displace the upper portion 166 in a direction away from the flexures 184 prior to connection of the flexures 184 to the upper portion 166. This minimizes errors due to bending of flexure elements 174 for displacements of the platens 152 and 154 relative to each other.

Sensor(s) measure linear displacement of the upper platen 154 relative to the lower platen 152. The sensors can be electrically (e.g. inductive, capacitive or resistive sensors), magnetically (e.g. magnetostriction sensors), optically (e.g. laser interferometer) based, or be combinations thereof. One advantageous embodiment, includes using strain gauges mounted to the flexible plate(s) of the flexures 184 so as to detect the strain therein due to displacement of support platens 152 and 154 relative to each other. The outputs of the sensor(s) used, such as but not limited to the strain gauges, are provided to the recorder and/or processing device 100.

It should be noted that, if desired, support members 70 or 72 can be integrally formed as a single unitary body with portions of spacer 52, sensing device 122 and sensing device 150.

FIGS. 13-16 illustrate displacement transducer 140 incorporated in a test system 220. Test system 220 includes a test specimen support assembly 223 arranged to support a test specimen (not shown). Herein by example, the test specimen support assembly 223 includes a crosshead 222 and a support platen 224. In this embodiment, one or more actuator assemblies 221 are coupled to the crosshead 222 and/or the test specimen directly to selectively displace and/or apply loads to the test specimen directly and/or through the crosshead 222. The test specimen (not shown) such as but not limited to an elastomer bushing is coupled to the crosshead 222 and to the support platen 224. The displacement transducer 140 in effect measures motion of a moveable end of the test specimen relative to a stationary or fixed portion secured to platen 224, herein via the use of two pivoting assemblies 58. However, it should be understood that the test system depicted is but one example wherein if desired by the test specimen to be tested and/or the configuration of actuator(s) coupled directly or indirectly to the test specimen, a displacement transducer comprising a single pivoting assembly 58 may be used.

Figure 13:
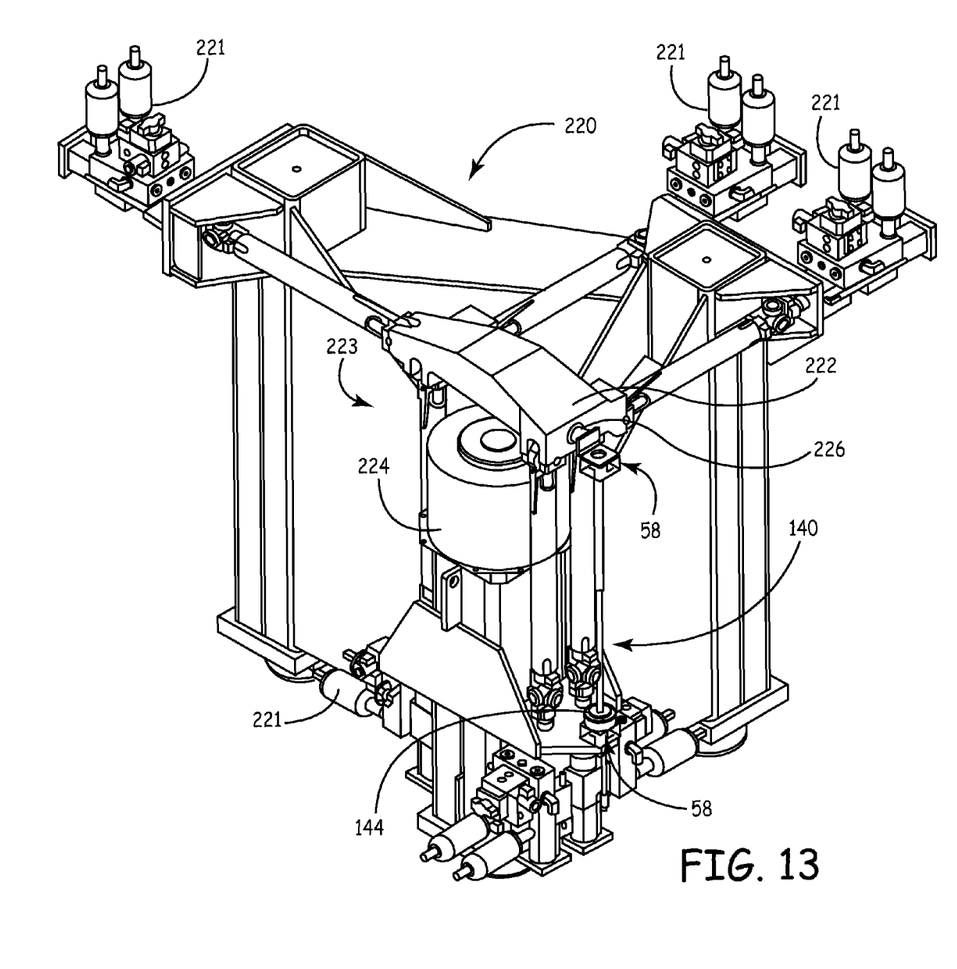
FIG. 13 is a perspective view of a testing machine.
Figure 14:
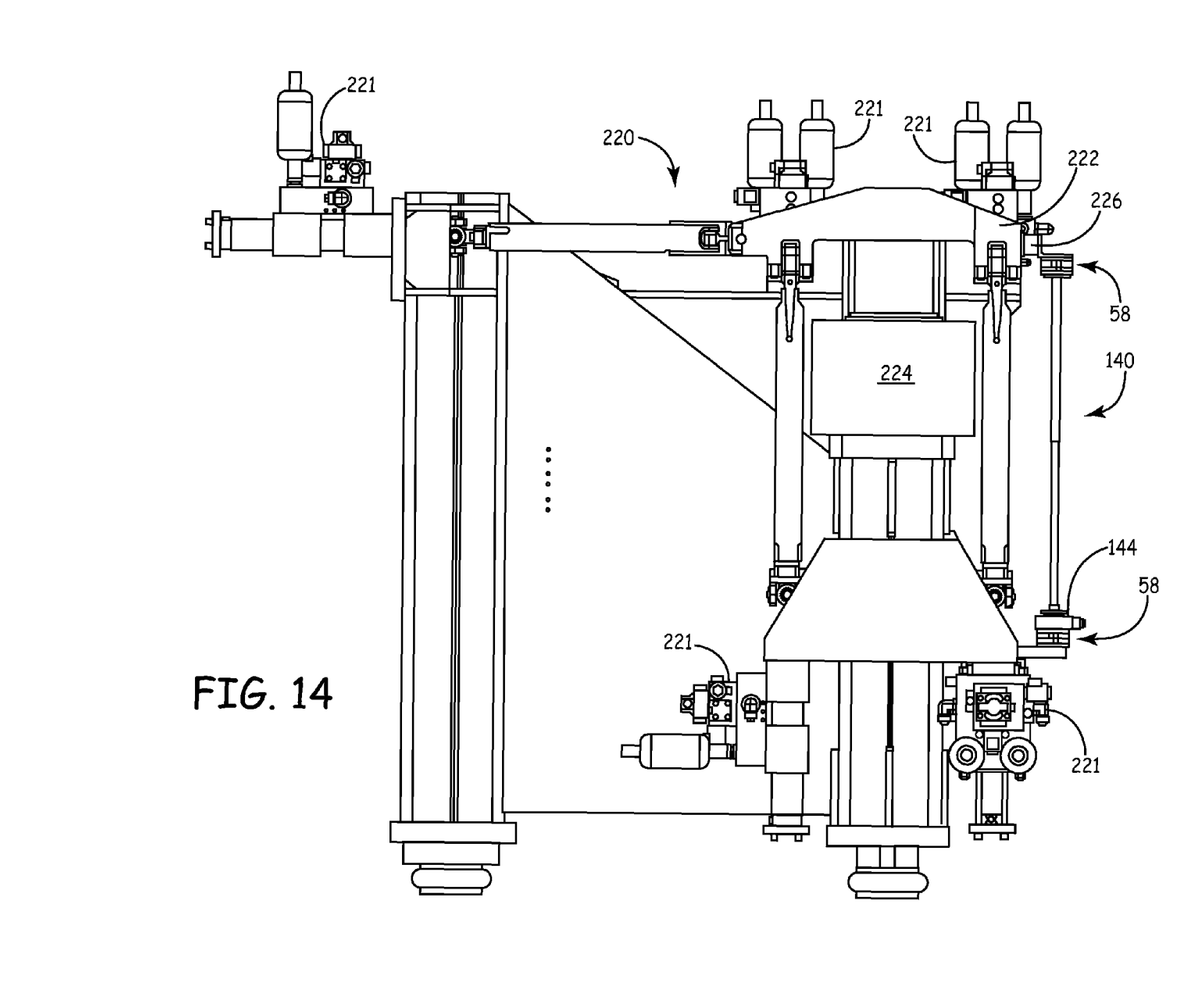
FIG. 14 is a front elevational view of the testing machine of FIG. 13.
Figure 15:
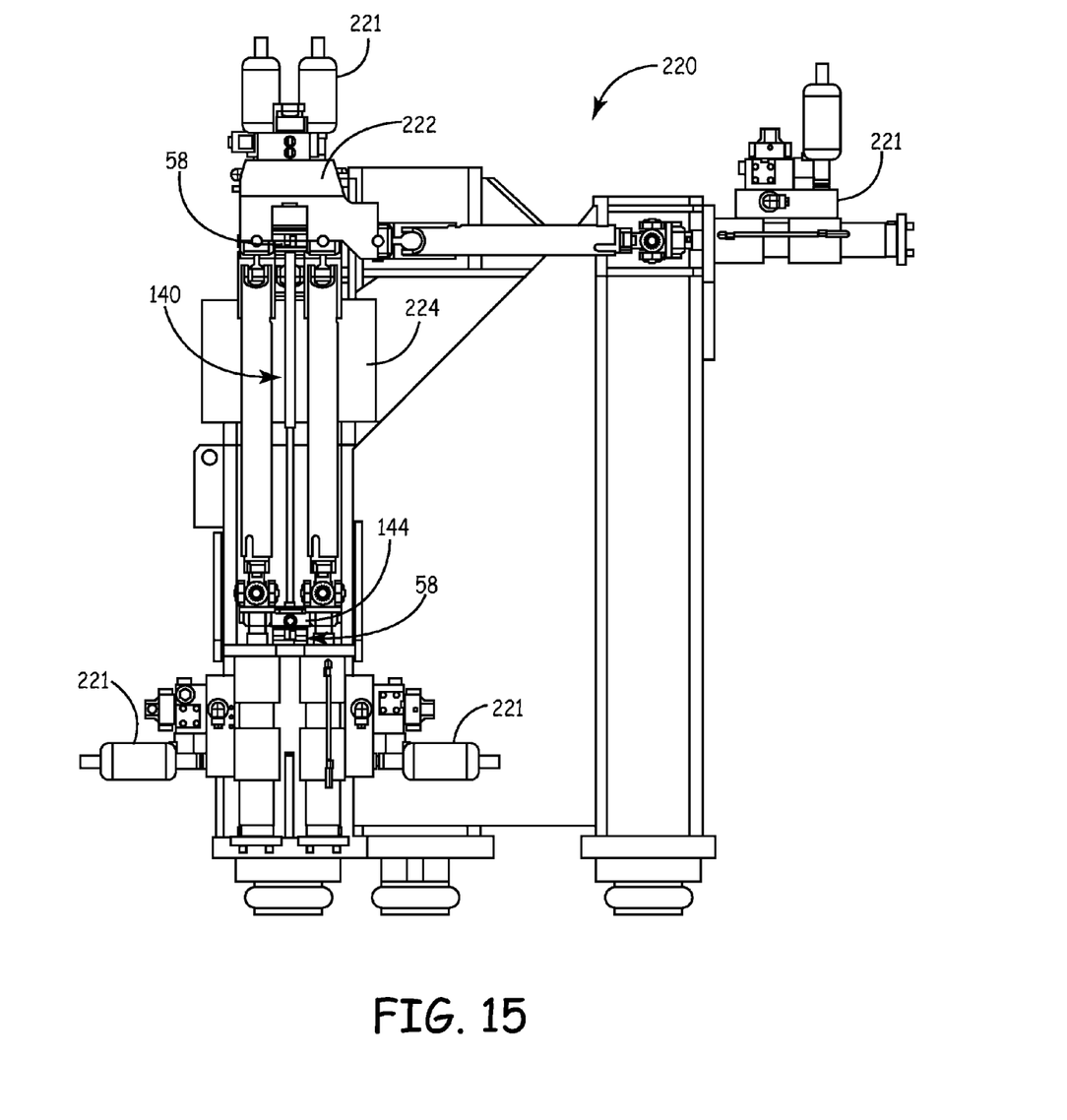
FIG. 15 is a side elevational view of the testing machine of FIG. 13.
Figure 16:
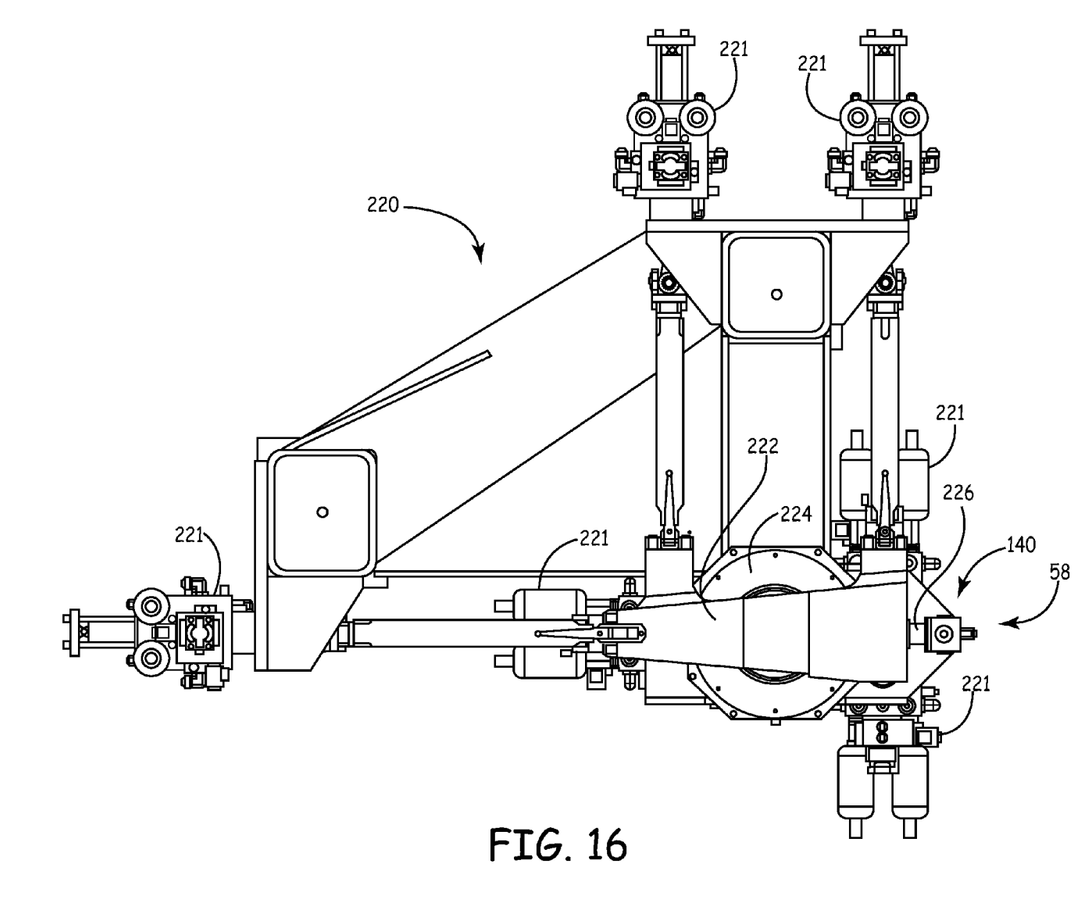
FIG. 16 is a top plan view of the testing machine of FIG. 13.

If desired, a rotational coupling (e.g. bearing) and encoder 226 can be provided to join the support member (e.g. 70) of the pivoting assembly 58 to the crosshead 222. The sensing axis of the encoder 226 is parallel to one of the pivoting axes in the pivoting assembly 58. Incorporation of the encoder 226 is particularly useful when angular displacements are greater than those allowable by the cross-flexures for that axis. In this manner, if desired, pivotal motion of the support member can be selectively locked with a locking device, thereby making that pivoting assembly 58 pivotable about only one axis. Encoder 226 would then provide the signal to recorder or processor 100 used for calculation of displacement(s). It should be understood that in an alternative embodiment, the pivoting assembly 58 can be constructed to only have one operational pivoting axis (rather than two as illustrated in FIGS. 2 and 3) when the encoder 226 (or other rotational sensor) is provided and operably coupled to the support member, thereby in effect allowing the support member to pivot in two degrees of freedom.

Aspects of the present invention have now been described with reference to several embodiments. Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A displacement transducer body comprising:
   a first pivoting assembly and a second pivoting assembly, each pivoting assembly having a support member pivotable relative to another portion about two orthogonal axes; and
   a structure joining said another portion of each pivoting assembly together.

2. The displacement transducer body of claim 1 wherein the two orthogonal axes intersect.

3. The displacement transducer body of claim 2 wherein the structure comprises a rigid spacer.

4. The displacement transducer body of claim 2 wherein the structure comprises a movable structure allowing movement of said another portion of each pivoting assembly linearly along and/or rotationally about an axis that is mutually orthogonal to each of the two orthogonal axes.

5. The displacement transducer body of claim 4 wherein the movable structure comprises a sensing device configured to provide an output signal related to movement of said another portion of each pivoting assembly relative to each other linearly along and/or rotationally about the axis that is mutually orthogonal to each of the two orthogonal axes.

6. The displacement transducer body of claim 5 wherein each pivoting assembly comprises angular sensing devices to provide output signals related to angular movement of said portions of each pivoting assembly about each of the two orthogonal axes.

7. The displacement transducer body of claim 2 wherein each pivoting assembly comprises angular sensing devices to provide output signals related to angular movement of the support member relative to said another portion of each pivoting assembly about each of the two orthogonal axes.

8. The displacement transducer body of claim 2 wherein each of the pivoting assemblies comprises a cross flexure assembly allowing the support member to pivot relative to the another portion about the two orthogonal axes.

9. The displacement transducer body of claim 8 wherein each cross flexure assembly comprises an intermediate member and a first cross flexure arrangement of flexure members coupling the intermediate member to the support member and a second cross flexure arrangement of flexure members coupling the intermediate member to the another portion.

10. The displacement transducer body of claim 9 wherein the first cross flexure arrangement comprises a first pair of orthogonal flexible plates with a set of orthogonal flexible plates of the first pair of orthogonal flexible plates disposed on each side of the intermediate member so as to define a first axis of the two orthogonal axes, and wherein the second cross flexure arrangement comprises a second pair of orthogonal flexible plates with a set of orthogonal flexible plates of the second pair of orthogonal flexible plates disposed on each side of the intermediate member so as to define a second axis of the two orthogonal axes.

11. The displacement transducer body of claim 10 wherein each pivoting assembly comprises angular sensing devices to provide output signals related to angular movement of the support member relative to said another portion of each pivoting assembly about each of the two orthogonal axes.

12. A displacement transducer comprising:
a first support member;
a second support member;
a cross flexure assembly joining the first support member to the second support member, the cross flexure assembly arranged to allow the first support member to pivot relative to the second support member about two intersecting orthogonal axes;
an angular sensing device arranged to provide an output signal related to angular movement of the first support member relative to the second support member about at least one of the orthogonal axes.

13. The displacement transducer of claim 12 wherein the angular sensing device provides an output signal related to angular movement of the first support member relative to the second support member about each of the orthogonal axes.

14. The displacement transducer of claim 13 wherein each cross flexure assembly comprises an intermediate member and a first cross flexure arrangement of flexure members coupling the intermediate member to the first support member and a second cross flexure arrangement of flexure members coupling the intermediate member to the second support member.

15. The displacement transducer of claim 14 wherein the first cross flexure arrangement comprises a first pair of orthogonal flexible plates with a set of orthogonal flexible plates of the first pair of orthogonal flexible plates disposed on each side of the intermediate member so as to define a first axis of the two orthogonal axes, and wherein the second cross flexure arrangement comprises a second pair of orthogonal flexible plates with a set of orthogonal flexible plates of the second pair of orthogonal flexible plates disposed on each side of the intermediate member so as to define a second axis of the two orthogonal axes.

16. A test system comprising:
a test specimen support assembly arranged to support a test specimen;
an actuator arranged to displace and/or apply a load to the test specimen support assembly; and
a displacement transducer configured to measure displacement of the test specimen support assembly, the displacement transducer comprising:
a first support member;
a second support member;
a cross flexure assembly joining the first support member to the second support member, the cross flexure arranged to the first support member to pivot relative to the second support member about two intersecting orthogonal axes; and
an angular sensing device arranged to provide an output signal related to angular movement of the first support member relative to the second support member about at least one of the orthogonal axes.

17. A test system comprising:
a test specimen support assembly arranged to support a test specimen;
an actuator arranged to displace and/or apply a load to the test specimen support assembly;
a displacement transducer configured to measure displacement of the test specimen support assembly, the displacement transducer comprising:
a first pivoting assembly and a second pivoting assembly, each pivoting assembly having a support member pivotable relative to another portion about two orthogonal axes;
a structure joining said another portion of each pivoting assembly together; and
an angular sensing device arranged to provide an output signal related to angular movement of the first support member relative to the second support member about at least one of the orthogonal axes.

18. The test system of claim 17 wherein the structure comprises a movable structure allowing movement of said another portion of each pivoting assembly linearly along and/or rotationally about an axis that is mutually orthogonal to each of the two orthogonal axes.

19. The test system of claim 18 wherein the movable structure comprises a sensing device configured to provide an output signal related to movement of said another portion of each pivoting assembly linearly along and/or rotationally about the axis that is mutually orthogonal to each of the two orthogonal axes.

20. The test system of claim 19 wherein each pivoting assembly comprises a cross flexure assembly including an intermediate member and a first cross flexure arrangement of flexure members coupling the intermediate member to the support member and a second cross flexure arrangement of flexure members coupling the intermediate member to the another portion.

* * * * *